(12) United States Patent
Hagi

(10) Patent No.: US 6,681,260 B1
(45) Date of Patent: Jan. 20, 2004

(54) DATA TRANSFER METHOD IN FUNCTION EXPANSION SYSTEM

(75) Inventor: Kazuo Hagi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/553,477

(22) Filed: Apr. 20, 2000

(30) Foreign Application Priority Data

Apr. 21, 1999 (JP) ............................................ 11-113004

(51) Int. Cl.[7] .............................................. G06F 15/16
(52) U.S. Cl. ....................... 709/250; 709/201; 709/203; 711/145; 711/158
(58) Field of Search ................................ 709/250, 201, 709/203; 711/145, 158

(56) References Cited

U.S. PATENT DOCUMENTS 5,978,875 A      11/1999  Asano et al.
6,167,489 A  *  12/2000  Bauman et al. ............. 711/145
6,226,721 B1 *   5/2001  Strongin et al. ............ 711/158
6,393,534 B1 *   5/2002  Chen et al. ................. 711/158

FOREIGN PATENT DOCUMENTS

EP    0 293 860      12/1988
JP    61-281797 A    12/1986
JP    1-98048 A       4/1989
JP    4-14378         3/1992
JP    4-215158 A      8/1992
JP    4-241541 A      8/1992
JP    6-268690 A      9/1994
JP    9-251437 A      9/1997

* cited by examiner

Primary Examiner—Zarni Maung
Assistant Examiner—Jinsong Hu
(74) Attorney, Agent, or Firm—Foley & Lardner

(57) ABSTRACT

A system and data transfer method capable of reducing the influence of data transfer upon processing of the software is disclosed. Access to the memory by each of the processor and the communication interfaces is managed by a scheduler. When storing data received from a communication interface into the memory, a message converter receives a reception completion message from the communication interface and converts it to a transmission request message when determining that the data having stored in the memory is data to be sent to another communication interface. When receiving the transmission request message, the other communication interface reads the data from the memory.

21 Claims, 9 Drawing Sheets

DATA TRANSFER METHOD IN FUNCTION EXPANSION SYSTEM

BACKGROUND OF THE INVENTION

1. Field of the Invention

The present invention generally relates to a function expansion system, and in particular to a data transfer method in a function expansion system in which a plurality of communication interfaces connected to a bus transfer data via a memory connected to a processor.

2. Description of the Related Art

In general, a computer is provided with a plurality of expansion slots to extend its function or performance. For example, when a communication interface card such as a LAN (local-area network) card plugs into an expansion slot of a computer, the computer's ability can be extended to send and receive data through the network.

Referring to FIG. 1, such a function expansion system has a plurality of communication interfaces 8-1, 8-2, . . . , connected to a processor 2 and a memory 3 via a bus 100. Data transfer between two communication interfaces 8-1 and 8-2 is conducted via the memory 3 under the control of the processor 2.

In such a function expansion system, data transfer is typically performed such that a communication interface 8-1 or 8-2 writes received data into the memory 3 and, when finishing the writing operation, the communication interface writes a reception completion notice message into a different area of the memory 3 and then issues an interrupt signal 211 or 212 to the processor 2.

By an interrupt signal 220 supplied from an interrupt controller 21 in response to the interrupt signal 211 or 212, software for conducting data reception processing is started in the processor 2. The software conducts processing on the reception completion notice message, generates a transmission request message, and sends it to the communication interface 8-1 or 8-2 which should transmit data stored in the memory 3.

Upon receiving the transmission request message, the communication interface 8-1 or 8-2 reads data to be transmitted, from the memory 3 and transfers the read data to outside (e.g. LAN). When the data to be transmitted has been completely sent, the communication interface writes a transmission completion message into a different area of the memory 3, and notifies the processor 2 of the transmission completion by issuing the interrupt signal 211 or 212 to the processor 2. In FIG. 1, reference numeral 4 denotes a processor interface, reference numeral 5 denotes a memory controller, and reference numeral 6 denotes a bus controller.

In the above-described conventional data transfer method, an interrupt signal to the processor is generated every time data is received or transmitted. This results in a problem that processing of other software which is being processed by the processor simultaneously with the data transfer is affected.

Furthermore, since access to the memory is not managed, the following disadvantages are developed. When the processor 2 frequently gains access to the memory 3, data transfer is likely to be stopped. In the case where the processor is performing high-speed data transfer, processing of other software executed by the processor is affected.

In order to solve these problems, there have been proposed a method of raising the processing speed of the processor 2, and a method of adding an instruction for processing a multimedia signal to processing instructions of the processor 2.

So long as such a configuration that an interrupt indicating the reception completion or transmission request issued by a communication interface is processed by software, however, it is impossible to solve such a problem that the software processing is not in time for data transfer increased in speed.

There have been proposed a data processing device allowing high-speed data transfer without software interrupt to a CPU in Japanese Patent Publication No. 4-14378. More specifically, the data transfer processing performed by character control is implemented with hardware, resulting in high-speed transmission/reception data transfer with reduced burden upon the CPU.

SUMMARY OF THE INVENTION

An object of the present invention is to provide a function expansion system and a data transfer method which are capable of reducing the influence of data transfer operation upon the processing performed by software running on a processor.

According to the present invention, a system including a processor; a plurality of communication interfaces connected to a bus, each of which provides an expanded function of the system; and a memory connected to the processor, for storing data received from a first communication interface which is any of the communication interfaces, further includes a scheduler for managing access to the memory by each of the processor and the communication interfaces, and a message converter for converting a reception completion message received from the first communication interface to a transmission request message when determining from the reception completion message that the data having stored in the memory is data to be sent to a second communication interface which is another one of the communication interfaces, wherein the second communication interface reads the data from the memory when receiving the transmission request message.

The message converter preferably generates an interrupt to the processor when determining from the reception completion message that the data having stored in the memory is data to be processed with software running on the processor.

The first communication interface may send the reception completion message to the message converter when the data has been stored into the memory.

The scheduler preferably manages access to the memory by each of the processor and the communication interfaces according to a schedule determined for each of the processor and the communication interfaces. The scheduler may manage access to the memory by each of the processor and the communication interfaces such that a predetermined scheduling period is divided into a plurality of access permission periods, each of which is assigned to one of the processor and the communication interfaces. The predetermined scheduling period may be divided into a plurality of access permission time slices, each of which is assigned to one of the processor and the communication interfaces at predetermined ratios among the processor and the communication interfaces.

The scheduler may give access permission to a communication interface when the processor does not generate an access request to the memory in an access permission time period assigned to the processor.

The scheduler may manage access to the memory by each of the processor and the communication interfaces such that an access request by each of the processor and the communication interfaces is permitted depending on whether number of times the access request has been generated for a predetermined scheduling period is smaller than a predetermined setting value.

As another embodiment, a storage medium is further connected to the bus such that one of the communication interfaces and the storage medium mutually transfer data via the memory.

According to another aspect of the present invention, a method for transferring data from a first communication interface to a second communication interface via the memory, includes the steps of: a) managing access to the memory by each of the processor and the communication interfaces; b) storing data received from the first communication interface into the memory; c) converting a reception completion message received from the first communication interface to a transmission request message when determining from the reception completion message that the data having stored in the memory is data to be sent to the second communication interface; and d) transferring the data from the memory to the second communication interface in response to the transmission request message.

As described above, according to the present invention, access to the memory by each of the processor or each of the communication interfaces is managed by the scheduler. Therefore, monopoly of access to the memory by the processor or a specific communication interface is avoided. Further, the influence of the data transfer on the software is reduced.

To be concrete, in a function expansion system using a data transfer method of the present invention, a plurality of communication interfaces connected to the bus transmit and receive data via the memory under the schedule determined by the scheduler.

Therefore, it becomes possible to assure operation of the software in the processor, and in addition transfer data from a communication interface to another communication interface via the memory without running the software to perform the processing of data transfer. Only in the case where data to be delivered to the software has been received, an interrupt to the processor is provided. As a result, frequency of interrupt to the processor can be reduced.

Furthermore, access of the processor to the memory and access of the communication interfaces to the memory are managed by the scheduler. As a result, the influence of the data transfer on the processing of the software can be lightened.

DETAILED DESCRIPTION OF THE PREFERRED EMBODIMENTS

Figure 2:
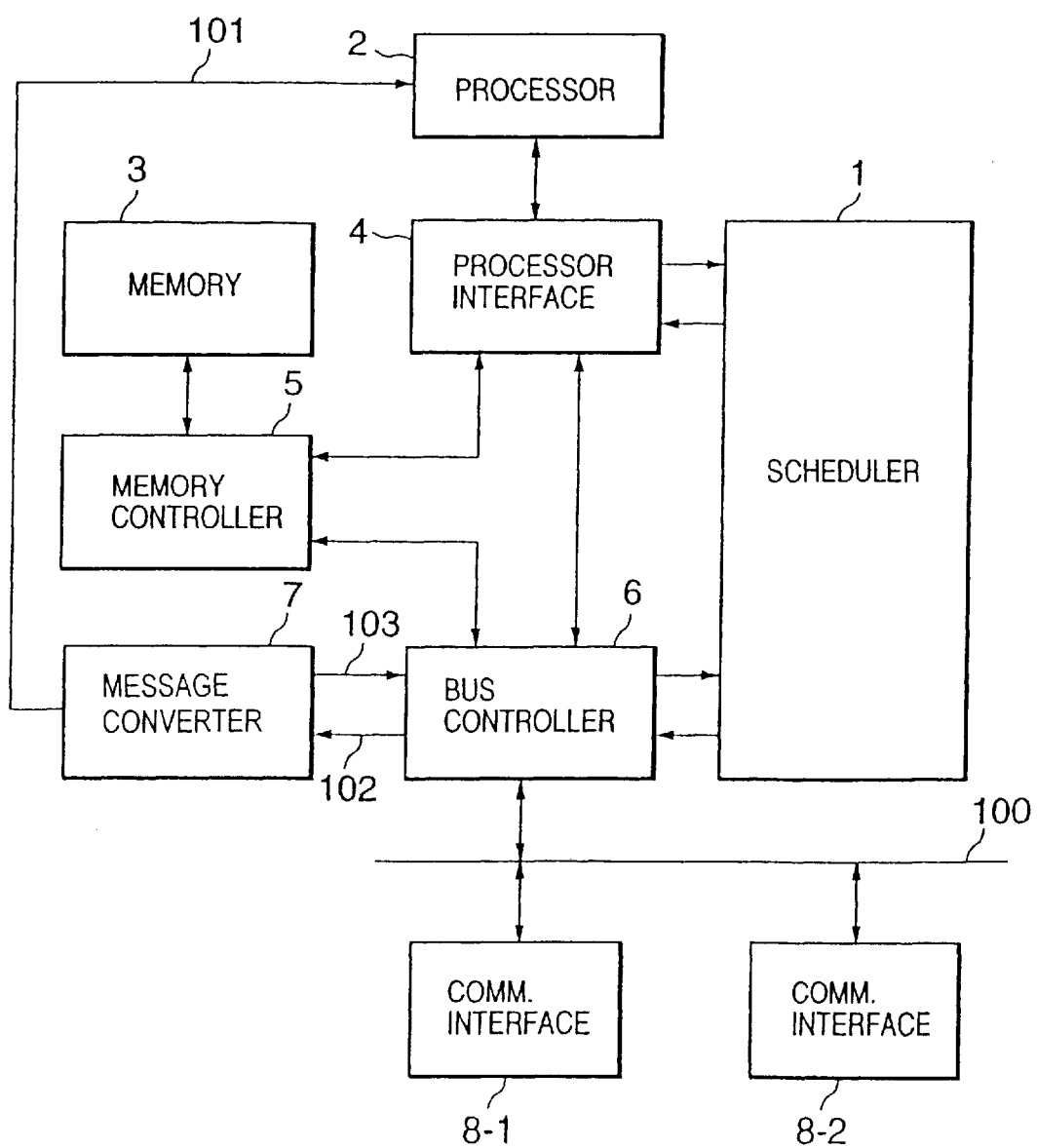
FIG. 2 is a block diagram showing the configuration of a function expansion system according to a first embodiment of the present invention.

Referring to FIG. 2, a function expansion system according to a first embodiment of the present invention is provided with a scheduler 1 which manages accesses of a processor 2 and a plurality of communication interfaces 8-1, 8-2, ... to a memory 3. The processor 2 is connected to a processor interface 4, which is connected to the scheduler 1, a memory controller 5, and a bus controller 6. The memory controller 5 is connected to the memory 3 for read/write control. The message converter 7 is connected to the processor 2. The bus controller 6 is connected to the scheduler 1, a message converter 7 and a bus 100. The bus 100 is connected to the communication interfaces 8-1, 8-2, .... The function expansion system is designed so that the communication interfaces 8-1 and 8-2 can mutually transmit and receive data via the memory 3 according to the scheduling of the scheduler 1 as described later.

Data received by the communication interface 8-1 is transferred to the bus controller 6 via the bus 100. The bus controller 6 obtains permission from the scheduler 1 before writing the received data into the memory 3 via the memory controller 5. Upon completely reception of the data, the communication interface 8-1 sends a reception completion notice 102 to the message converter 7 through the bus controller 6.

The message converter 7 checks the reception completion notice 102. If the received data is data to be transferred to another communication interface (here, 8-2), then the message converter 7 generates a transmission request notice 103 from the reception completion notice 102, and sends the transmission request notice 103 to the communication interfaces 8-2 to which the data should be sent.

Upon reception of the transmission request notice 103, the communication interface 8-2 requests the bus controller 6 to read out data from the memory 3. The bus controller 6 obtains permission from the scheduler 1 before reading out data from the memory 3 via the memory controller 5, and transfers the read data to the communication interface 8-2 via the bus 100.

If the reception completion notice 102 indicates that the received data is data to be delivered to the software, then the message converter 7 issues an interrupt signal 101 to the processor 23. The process 2 issues a data write/read request to the memory controller 5 via the processor interface 4. The processor interface 4 obtains permission from the scheduler 1 before performing data reading/writing on the memory 3.

The scheduler 1 holds a setting value indicating a memory access permission ratio between the processing of data transfer from one communication interface to another communication interface via the memory 3 and the processing of reading/writing data from/into the memory 3 performed by the processor 2. In other words, the memory access permission ratio determines a ratio of access to the memory 3 permitted to the processor 2 and a ratio of access to the memory 3 permitted to the communication interfaces 8-1 and 8-2. According to the setting value, the scheduler 1 gives permission to the processor interface 4 and the bus controller 6 for access to the memory 3.

In this manner, the function expansion system according to the present invention can prevent the read/write processing conducted by the processor 2 and the data transfer between communication interfaces from exerting an influence upon each other.

Assuming that four communication interfaces 8-1 to 8-4 (where the communication interfaces 8-3 and 8-4 are not illustrated) are connected to the bus 100, the details of the scheduling performed by the scheduler 1 will be described hereinafter.

Figure 3:
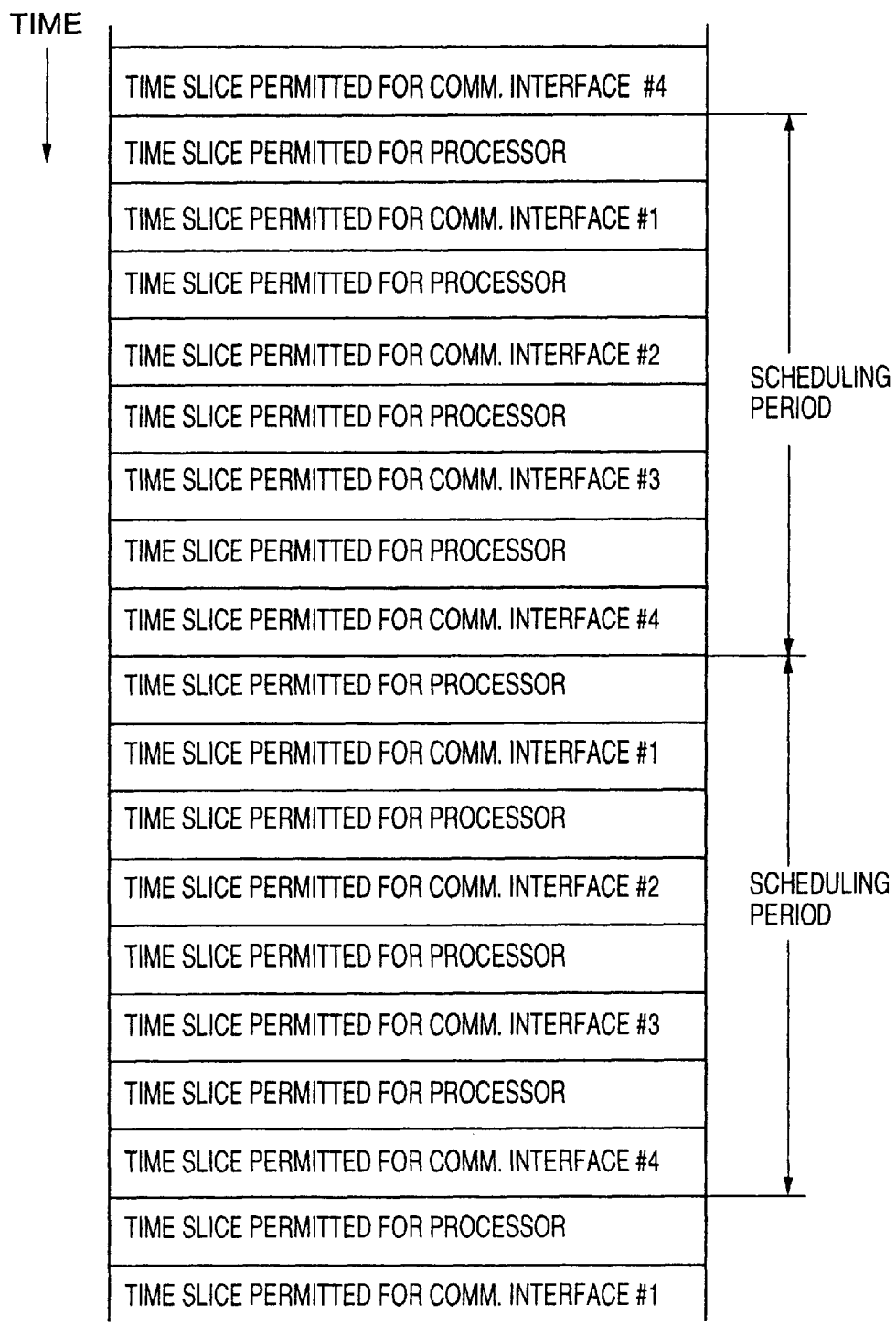
FIG. 3 is a diagram showing a sequence of access permission operations performed by a scheduler of FIG. 2.

Referring to FIG. 3, the scheduler 1 divides a predetermined scheduling period into eight equal time slices and assigns half of the scheduling period to the access to the memory 3 conducted by the processor 2 and assigns an eighth of the schedule period to each of four communication interfaces 8-1 to 8-4. Permission to access the memory 3 is given to either the processor 2 of a corresponding one of the communication interfaces 8-1 to 8-4 for each time slice. Therefore, there is prevented mutual influence caused between the read/write processing from/into the memory 3 conducted by the processor 2 and the data transfer processing between the communication interfaces 8-1 to 8-4 via the memory 3.

In the first embodiment of the present invention, permission to the processor 2 and permission to the communication interfaces 8-1 to 8-4 for access to the memory 3 can also be scheduled more finely. For example, access to the memory 3 is not permitted at equal time slices. Instead, access to the memory 3 may be managed based on the sum total of access time for each of the processor 2 and the communication interfaces in the schedule period. Or permission may be given to the communication interfaces 8-1 to 8-4 in such an interval that permission is given to the processor 2 but an access request is not issued by the processor 2.

Figure 4A:
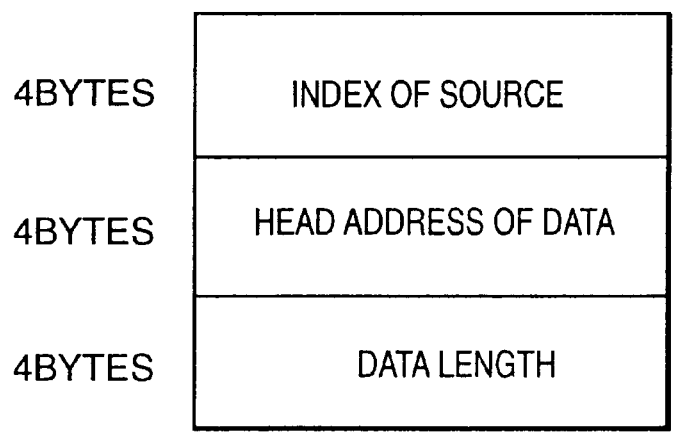
FIG. 4A is a diagram showing a format of a reception completion notice sent from a bus controller to a message converter of FIG. 2

Referring to FIG. 4A, the reception completion notice 102 is composed of a source index for identifying a specific one of the communication interfaces 8-1 and 8-2, a head address of the memory 3 in which data has been written, and a data length of the written data.

Figure 4B:
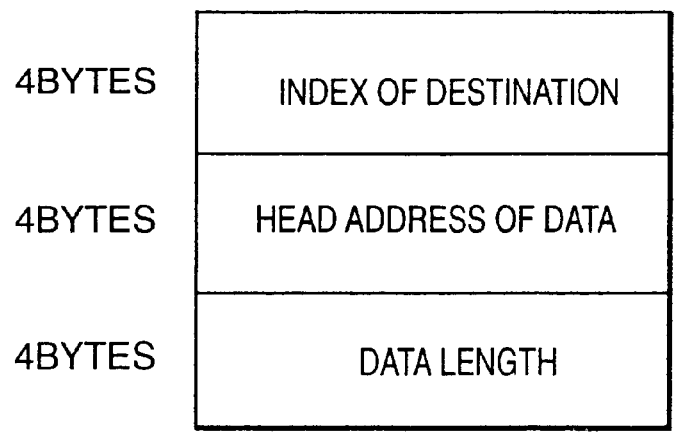
FIG. 4B is a diagram showing a format of a transmission request notice sent from the message converter to the bus controller of FIG. 2

Referring to FIG. 4B, the transmission request notice 103 is composed of a destination index for identifying a specific one of the communication interfaces 8-1 and 8-2 to which data is to be transmitted, a head address of data to be transmitted stored in the memory 3, and a data length of the data to be transmitted.

The communication interface 8-1 or 8-2 which has finished writing data into the memory 3 uses the reception completion notice 102 as shown in FIG. 4A to notify the message converter 7 of an index specifying the data transfer source, a head address of the data storing area of the memory 3 in which data has been written, and a length of the written data.

The message converter 7 has a transfer table (not shown) for obtaining a transfer destination index from a transfer source index of data. From the transfer source index of the reception completion nozzle 102, the message converter 7 derives the index of the transfer destination.

In the case where the received data is data to be transferred to another communication interface 8-2 or 8-1, the message converter 7 generates a transmission request notice 103 by replacing the index of the transfer source of the reception completion notice 102 with the index of transfer destination referring to the transfer table, and sends the transmission request notice 103 to the communication interface 8-2 or 8-1 which is the transfer destination of data.

Upon reception of the transmission request, the communication interface 8-2 or 8-1 reads out a specified length of data from the designated head address of the memory 3 and transmits the data to outside. If the data transfer destination is not a communication interface but software on the processor 2, then the message converter 7 issues an interrupt signal 101 to the processor 2.

Data Transfer Operation

By referring to FIGS. 2 to 7, a data transfer operation according to the first embodiment of the present invention will be described. For simplicity, it is assumed that the communication interface 8-1 receives data from outside.

Figure 5:
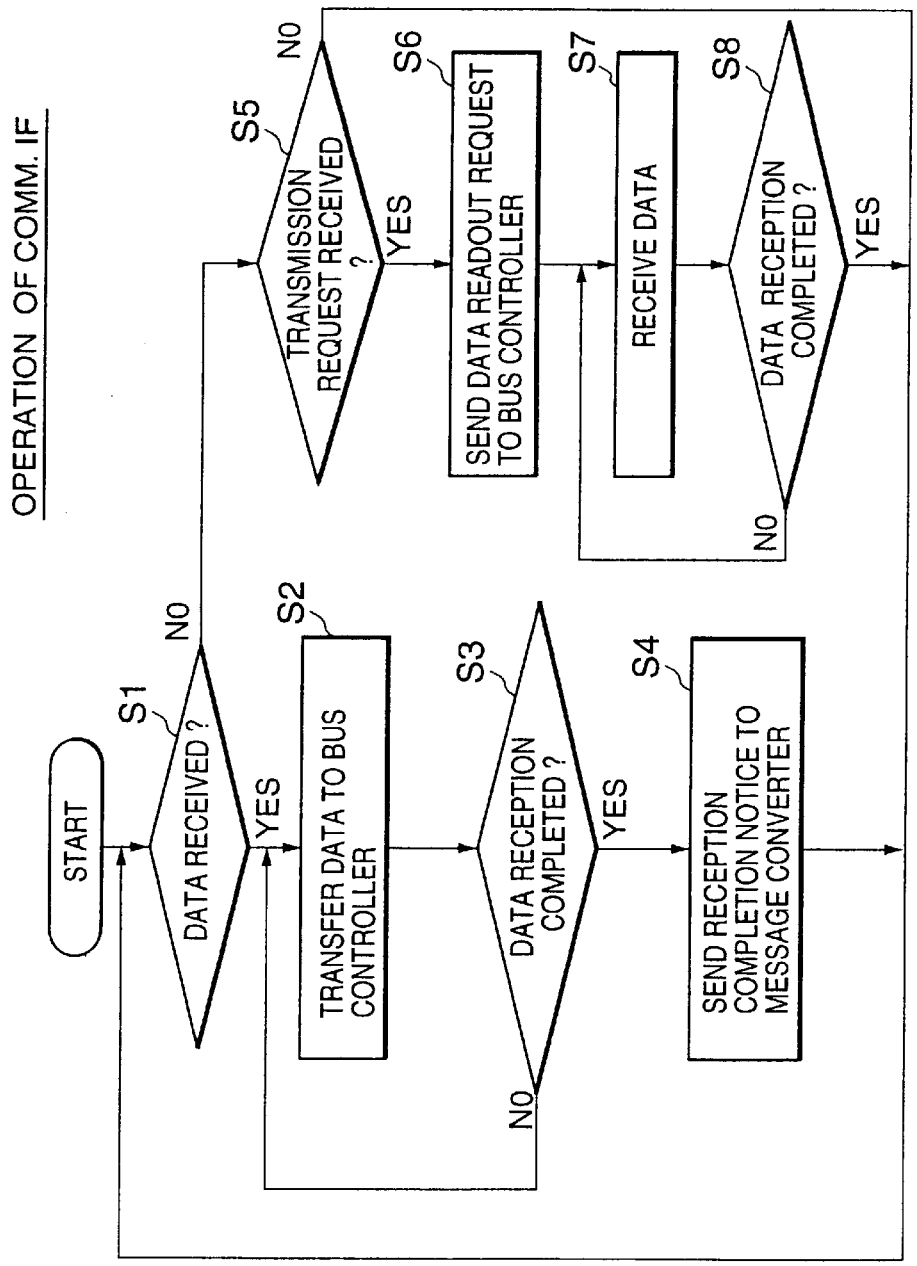
FIG. 5 is a flow chart showing a processing operation of a communication interface of FIG. 2.

Referring to FIG. 5, upon receiving data (YES at step S1), the communication interface 8-1 transfers the data to the bus controller 6 via the bus 100 (step S2). The bus controller 6 obtains permission from the scheduler 1 to write the data into the memory 3 via the memory controller 5. When the data reception has been completed (YES at step S3), the communication interface 8-1 sends a reception completion notice 102 to the message converter 7 (step S4).

Figure 6:
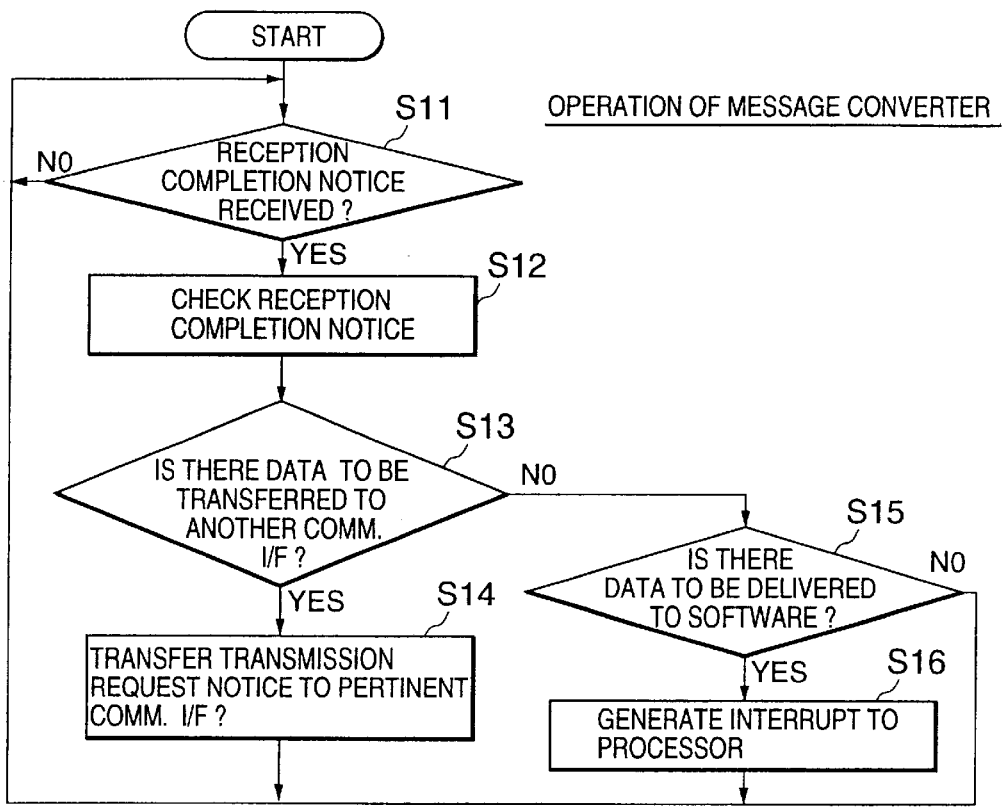
FIG. 6 is a flow chart showing a processing operation of the message converter of FIG. 2.

Referring to FIG. 6, upon receiving the reception completion notice 102 from the communication interface 8-1 via the bus 100 and the bus controller 6 (YES at step S11), the message converter 7 checks the reception completion notice 102 (step S12). If the data is data to be transferred to another communication interface 8-2 (YES at step S13), then the message converter 7 generates a transmission request notice 103 from the reception completion notice 102, and sends the transmission request notice 103 to the communication interface 8-2 which should transmit data (step S14).

Returning to FIG. 5, when receiving the transmission request notice 103 from the message converter 7 via the bus 100 and the bus controller 6 (YES at step S5), the communication interface 8-2 outputs a data readout request to the bus controller 6 (step S6). The bus controller 6 obtains permission from the scheduler 1 to read out data from the memory 3 via the memory controller 5, and transfers the readout data to the communication interface 8-2 via the bus 100. The communication interface 8-2 receives the data from the bus controller 6 until all the data have been received (steps S7 and S8).

On the other hand, as shown in FIG. 6, if the reception completion notice 102 indicates that the received data is data to be delivered to the software (YES at step S15), the message converter 7 issues an interrupt signal 101 to the processor 2 (step S16). A data write/read request issued from the processor 2 to the memory 3 is supplied to the processor interface 4. The processor interface 4 obtains permission from the scheduler 1 and then writes/reads data into/from the memory 3.

Figure 7:
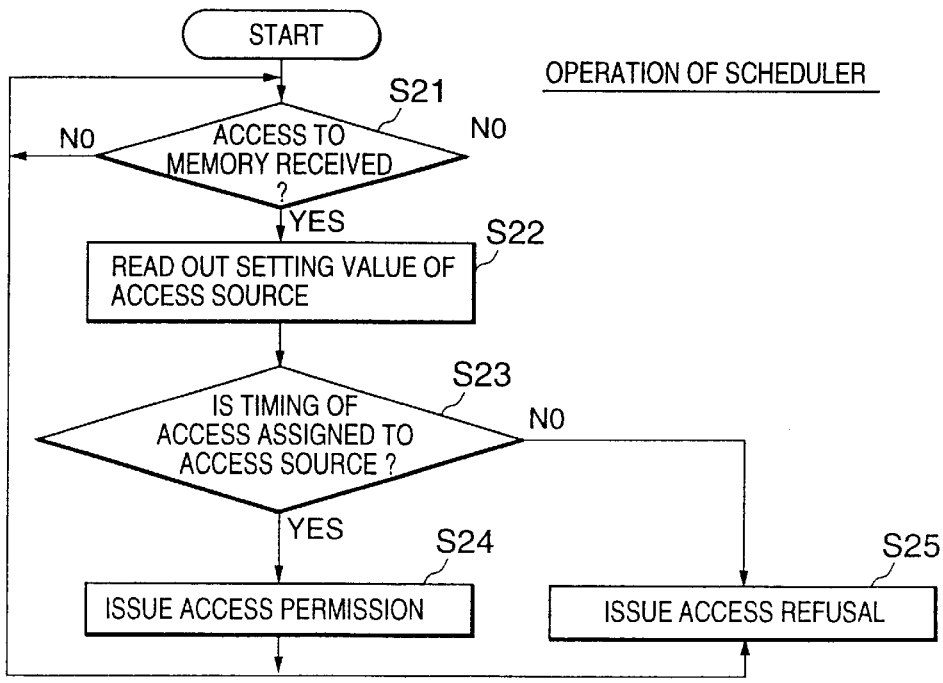
FIG. 7 is a flow chart showing a processing operation of a scheduler of FIG. 2.

Referring to FIG. 7, when receiving a request for access to the memory 3 from the processor 2 or from the communication interface 8-1 or 8-2 (YES at step S21), then the scheduler 1 reads out the setting value of the access source from a table which is not illustrated (step S22). And the scheduler 1 determines whether the access timing of the access source is the predetermined timing previously assigned thereto (step S23).

If the scheduler 1 judges the access timing of the access source to be the predetermined timing assigned thereto (YES at step S23), then the scheduler 1 issues access permission (step S24). If the scheduler 1 judges the access timing of the access source not to be the predetermined timing (NO at step S23), then the scheduler 1 issues an access refusal (step S25).

By conducting the above-described processing, there can be prevented the influence of the read/write processing from/into the memory 3 conducted by the processor 2 on the data transfer, and the influence of the data transfer on the read/write processing from/into the memory 3 conducted by the processor 2.

Figure 1:
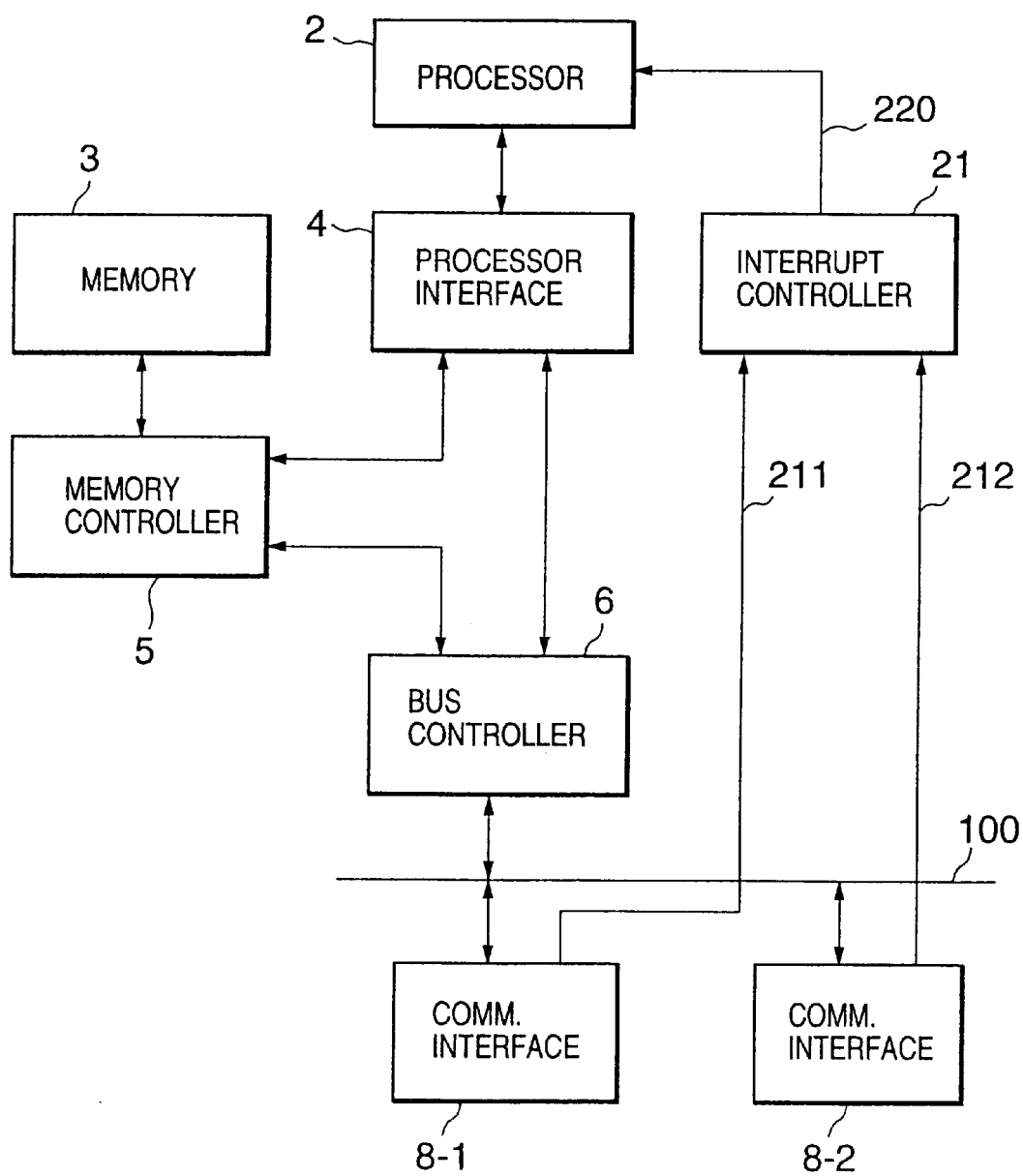
FIG. 1 is a block diagram showing the configuration of a function expansion system according to a conventional technique.

A second embodiment of the present invention will be described by referring to FIG. 8. Except that the processing of the scheduler is different, the function expansion system according to the second embodiment is similar to the configuration and operation of the first embodiment. Accordingly, the description will be given by referring to FIGS. 1 and 8.

The scheduler 1 has a table (not shown) containing setting values, each of which indicates a memory access permission ratio between the processing of data transfer from one communication interface to another communication interface via the memory 3 and the processing of reading/writing data from/into the memory 3 performed by the processor 2 to determine a ratio of access to the memory 3 permitted to the processor 2 and a ratio of access to the memory 3 permitted to each of the communication interfaces 8-1 and 8-2.

Figure 8:
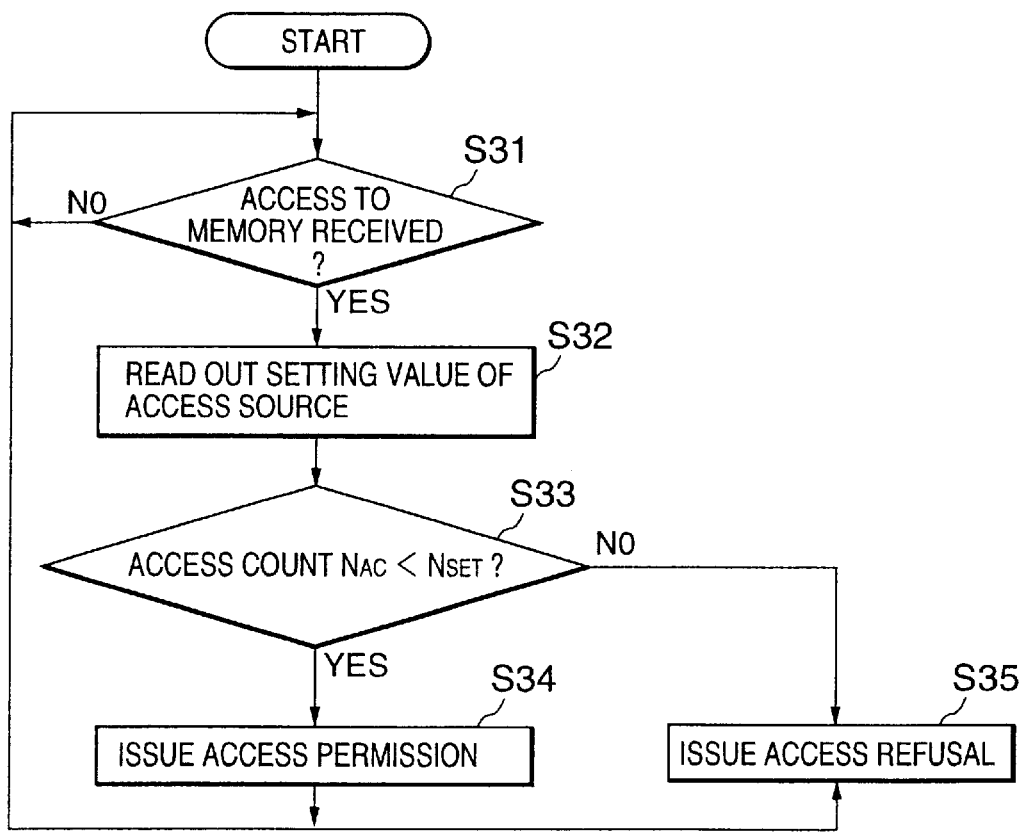
FIG. 8 is a flow chart showing a processing operation of a scheduler according to a second embodiment of the present invention.

Referring to FIG. 8, when receiving a request for access to the memory 3 from the processor 2 or from the communication interface 8-1 or 8-2 (YES at step S31), the scheduler 1 reads out the setting value $V_{SET}$ of the access source form the table (step S32). Then, the scheduler 1 determines whether access count $N_{AC}$ from that access source is less than the setting value $N_{SET}$ (step S33).

When it is determined that the access count $N_{AC}$ from the access source is less than the setting value $N_{SET}$ (YES at step S33), the scheduler 1 issues access permission (step S34). When it is determined that the access count $N_{AC}$ from the access source is not less than the setting value $N_{SET}$ (NO at step S33), the scheduler 1 issues access refusal (step S35).

Figure 9:
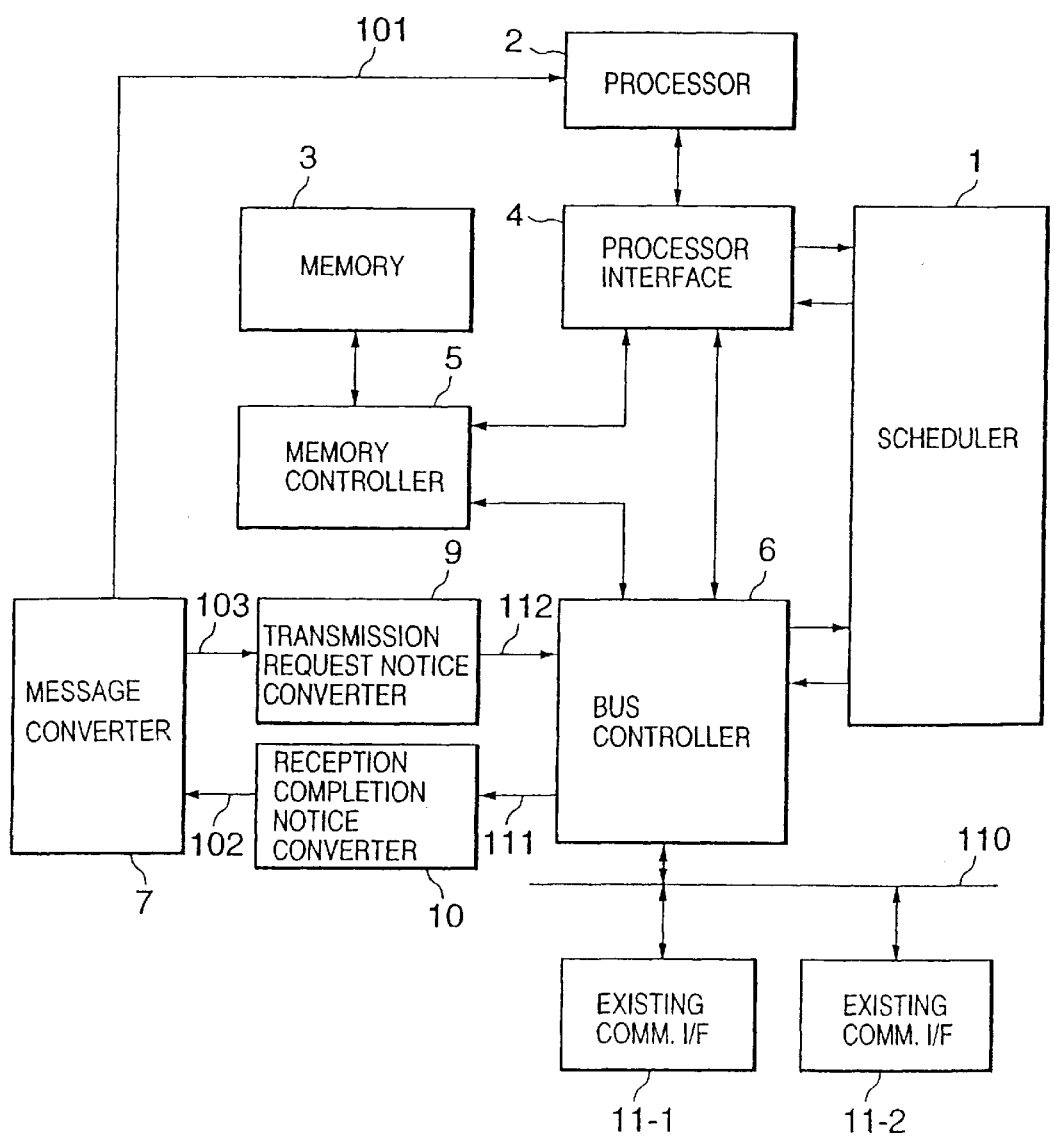
FIG. 9 is a block diagram showing the configuration of a function expansion system according to a third embodiment of the present invention.

A third embodiment of the present invention will be described by referring to FIG. 9. The function expansion system according to the third embodiment has a configuration similar to that of the first embodiment of FIG. 2, except that existing communication interfaces 11-1 and 11-2 are connected to a PCI (Peripheral Component Interconnect) bus 110, and a transmission request notice converter 9 and a reception completion notice converter 10 are provided between the bus controller 6 and the message converter 7. The same components are denoted by the same reference numerals and the respective operations thereof are the same as those of the first embodiment.

When the existing communication interface 11-1 or 11-2 has finished writing data into the memory 3, reception completion notice converter 10 converts a specific reception completion notice 111 to the above-described reception completion notice 102 in order to handle the specific reception completion notice 111. In this case, the reception completion notice converter 10 converts at least address information and data length of the specific reception completion notice 111 to head address and data length information of the above-described reception completion notice 102, respectively, and adds an index for identifying the existing communication interface 11-1 or 11-2 thereto.

Furthermore, each of the existing communication interface 11-1 and 11-2 needs a specific transmission request notice 112. Therefore, the transmission request notice converter 9 converts a transmission request notice 103 inputted from the message converter 7 to the specific transmission request notice 112. In this case, the transmission request notice converter 9 deletes at least an index for identifying the existing communication interface 11-1 or 11-2 from the transmission request notice 103 inputted from the message converter 7, and converts a head address and a data length of the transmission request notice 103 to address information and a data length of the specific transmission request notice 112.

As described above, the reception completion notice converter 10 and the transmission request notice converter 9 are provided for the existing communication interfaces 11-1 and 11-2. As a result, it is possible to obtain the same advantages as in the above-described embodiments of the present invention, in such a system that the existing communication interfaces 11-1 and 11-2 are connected by the PCI bus 110. Although the case of the PCI bus has been described in the third embodiment, the present invention can be applied to a SCSI (Small Computer System Interface) bus, an IDE (Intelligent Device Electronic) bus, and the like as well.

Figure 10:
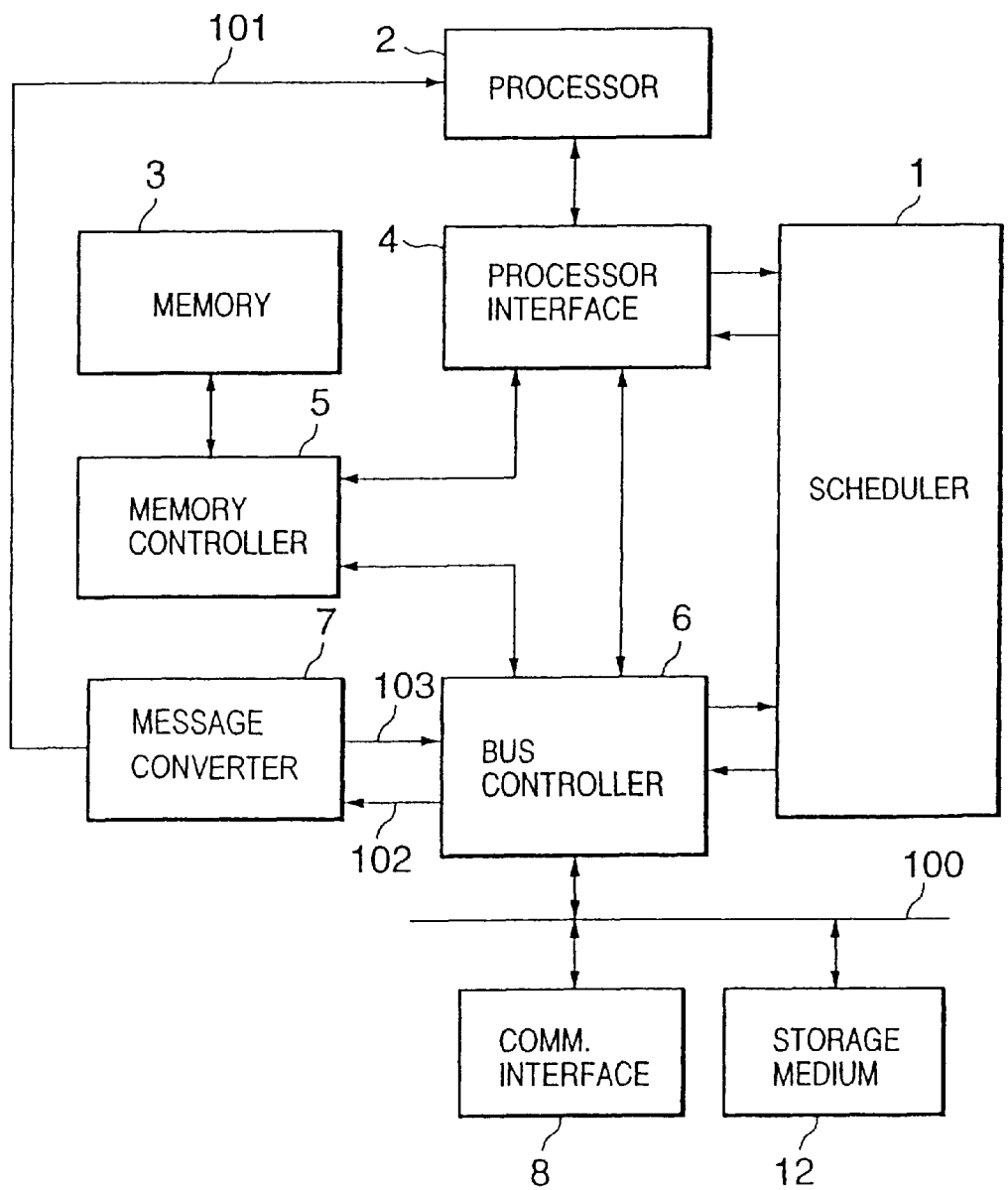
FIG. 10 is a block diagram showing the configuration of a function expansion system according to a fourth embodiment of the present invention.

A fourth embodiment of the present invention will be described by referring to FIG. 10. The function expansion system according to the fourth embodiment has a configuration similar to that of the function expansion system according to the first embodiment of the present invention, except that a storage medium 12 and a communication interface 8 are connected to the bus 100. The same components are denoted by the same reference numerals and the respective operations thereof are the same as those of the first embodiment.

In this case, the storage medium 12 performs processing similar to that of the communication interface 8 as to writing/reading data into/from the memory 3. As a result, it is possible to perform data transfer from the storage medium 12 to the communication interface 8 or data transfer from the communication interface 8 to the storage medium 12 without causing data transfer processing using software as described above.

Thus, in such a system that data is transferred between communication interfaces or the storage medium connected to the bus 100 or PCI bus 110 via the memory 3 connected to the processor 2, the scheduler 1 manages access to the memory 3 from the processor 2 and from the communication interface or the storage medium. Even if the number of times the processor 2 gains access to the memory 3 increases, therefore, the data transfer is not affected. Furthermore, even in the case where the data transfer has increased, access to the memory 3 from the processor 2 is not restricted.

Furthermore, if data is transferred between the communication interfaces or the communication interface and the storage medium, then the reception completion notice 102 is sent to the message converter 7 when a communication interface or a storage medium has finished writing data into the memory 3. The reception completion notice 102 is converted to a transmission request notice 103 by the message converter 7 and is sent back to the other communication interface which should transmit data to outside. Accordingly, it is prevented that the operation of the processor 2 is stopped by an interrupt resulting from the data reception and transmission. As a result, the processing capability of the processor 2 is not affected by the data transfer.

Furthermore, as for the data to be delivered to the software, the message converter 7 generates an interrupt signal 101 from the reception completion notice 102 and sends it to the processor 2. As a result, the data to be delivered to the software can be transferred in the same way as the conventional way. Therefore, the influence of the data transfer on the processing of the software can be lightened.

By the way, the present invention can be applied to information processing systems, communication control systems, or the like. In the case where the present invention is applied to a communication control system, it is also possible to form a combination of a buffer for temporarily storing transmitted/received data and the memory in one.

What is claimed is:

1. A system comprising:
   a processor;
   a plurality of communication interfaces connected to a bus, each of which provides an expanded function of the system;
   a memory connected to the processor, for storing data received from the communication interfaces;
   a scheduler for managing access to the memory by the processor and the communication interfaces; and
   a message converter, separate from said processor, for generating a transmission request message for a second communication interface upon receiving a reception completion message from a first communication interface that indicates that data stored in the memory by the first communication interface is data to be read from the memory by the second communication interface upon its receipt of the transmission request message.

2. The system according to claim 1, wherein the message converter generates an interrupt to the processor upon receiving a reception completion message that indicates that data stored in the memory by the first communication interface is data to be processed by software running on the processor.

3. The system according to claim 2, wherein the first communication interface sends the reception completion message to the message converter after completing the storage of said data into the memory.

4. The system according to claim 1, wherein the first communication interface sends the reception completion message to the message converter after completing the storage of said data into the memory.

5. The system according to claim 1, wherein the scheduler manages access to the memory by the processor and the communication interfaces according to a schedule determined for the processor and the communication interfaces.

6. The system according to claim 5, wherein the scheduler manages access to the memory by the processor and the communication interfaces such that a predetermined scheduling period is divided into a plurality of access permission periods, each of which is assigned to one of the processor and the communication interfaces.

7. The system according to claim 6, wherein each of the access permission periods is assigned to one of the processor and the communication interfaces at predetermined ratios among the processor and the communication interfaces.

8. The system according to claim 6, wherein the scheduler gives access permission to a communication interface when the processor does not generate an access request to the memory in an access permission time period assigned to the processor.

9. The system according to claim 5, wherein the scheduler manages access to the memory by the processor and the communication interfaces such that an access request is permitted if the number of requests for access by the requester within a predetermined scheduling period is smaller than a predetermined value.

10. The system according to claim 1, wherein a storage medium is further connected to the bus such that one of the communication interfaces and the storage medium mutually transfer data via the memory.

11. A system comprising:
    a processor connected to a processor interface;
    a memory connected to a memory controller which is connected to the processor interface;
    a plurality of communication interfaces connected to a bus which is connected to a bus controller which is connected to the processor interface and the memory controller, each of the communication interfaces providing an expanded function of the system;
    a scheduler connected to both the processor interface and the bus controller, for managing access to the memory by the processor and the communication interfaces; and
    a message converter connected to the bus controller and the processor and separate from said processor, for generating a transmission request message for a second communication interface upon receiving a reception completion message from a first communication interface that indicates that data stored in the memory by the first communication interface is data to be read from the memory by the second communication interface upon its receipt of the transmission request message.

12. In a system including a processor, a plurality of communication interfaces connected to a bus, each of which provides an expanded function of the system, and a memory connected to the processor, a method for transferring data from a first communication interface to a second communication interface via the memory, comprising the steps of:
    managing access to the memory by each of the processor and the communication interfaces by a scheduler;
    storing data received from the first communication interface into the memory;
    generating, in a message converter separate from said processor, a transmission request message for a second communication interface upon receiving a reception completion message from a first communication interface that indicates that data stored in the memory by the first communication interface is data to be read from the memory by the second communication interface upon its receipt of the transmission request; and
    transferring the data from the memory to the second communication interface in response to the transmission request message under control of the scheduler.

13. The method according to claim 12, further comprising the step of:
    generating an interrupt to the processor upon receiving a reception completion message that indicates that data stored in the memory by the first communication interface is data to be processed by software running on the processor.

14. The method according to claim 13, wherein the first communication interface sends the reception completion message to the message converter after completing the storage of said data into the memory.

15. The method according to claim 12, wherein the first communication interface sends the reception completion message to the message converter after completing the storage of said data into the memory.

16. The method according to claim 12, wherein access to the memory by the processor and the communication interfaces is managed by the scheduler according to a schedule determined for the processor and the communication interfaces.

17. The method according to claim 16, wherein the access to the memory by the processor and the communication interfaces is managed such that a predetermined scheduling period is divided into a plurality of access permission periods, each of which is assigned to one of the processor and the communication interfaces.

18. The method according to claim 17, wherein each of the access permission periods is assigned to one of the processor and the communication interfaces at predetermined ratios among the processor and the communication interfaces.

19. The method according to claim 17, wherein the scheduler gives access permission to a communication interface when the processor does not generate an access request to the memory in an access permission time period assigned to the processor.

20. The method according to claim 16, wherein the scheduler manages access to the memory by the processor and the communication interfaces such that an access is permitted if the number of requests for access by the requester within a predetermined scheduling period is smaller than a predetermined value.

21. The method according to claim 12, wherein a storage medium is further connected to the bus such that one of the communication interfaces and the storage medium mutually transfer data via the memory.

* * * * *